United States Patent
Grob

US009789574B2

(10) Patent No.: US 9,789,574 B2
(45) Date of Patent: Oct. 17, 2017

(54) FEED AND LOAD UNIT

(75) Inventor: Burkhart H. C. Grob, Bad Wörishofen (DE)

(73) Assignee: Grob-Werke GmbH & Co. KG, Mindelheim (DE)

( * ) Notice: Subject to any disclaimer, the term of this patent is extended or adjusted under 35 U.S.C. 154(b) by 665 days.

(21) Appl. No.: 13/362,922

(22) Filed: Jan. 31, 2012

(65) Prior Publication Data
US 2012/0195718 A1    Aug. 2, 2012

(30) Foreign Application Priority Data

Feb. 2, 2011    (DE) .................. 10 2011 010 152

(51) Int. Cl.
*B23Q 1/66*    (2006.01)
*B23Q 7/14*    (2006.01)

(52) U.S. Cl.
CPC ............. *B23Q 1/66* (2013.01); *B23Q 7/1431* (2013.01)

(58) Field of Classification Search
CPC . B23Q 7/00; B23Q 7/04; B23Q 7/048; B23Q 7/1426; B23Q 7/1431; B23Q 7/1478; B23Q 7/1489; B23Q 7/1494; B23Q 15/20; B23Q 1/4866; B23Q 1/606; B23Q 1/621; B23Q 1/66
USPC ............ 29/33 P, 563, 564; 198/345.1, 346.2; 414/222.01, 222.02, 222.03, 222.04, 414/222.05, 222.07, 222.09, 222.12, 414/225.01, 226.01, 226.05, 749.1
See application file for complete search history.

(56) References Cited

U.S. PATENT DOCUMENTS

| | | | |
|---|---|---|---|
| 4,715,490 A | | 12/1987 | Date et al. |
| 4,738,387 A | * | 4/1988 | Jaufmann et al. ............ 228/4.1 |
| 4,999,578 A | * | 3/1991 | Ohashi et al. ........... 324/757.02 |
| 5,054,175 A | * | 10/1991 | Date ............................ 29/33 P |
| 5,664,254 A | * | 9/1997 | Ohkura ............... H01L 21/6715 396/611 |
| 5,972,110 A | * | 10/1999 | Akimoto ........... H01L 21/67161 118/319 |
| 6,318,538 B1 | * | 11/2001 | Shibuya ............. G03F 7/70716 198/346.2 |
| 7,644,968 B2 | * | 1/2010 | Hirooka ........... H01L 21/68707 294/103.1 |

(Continued)

FOREIGN PATENT DOCUMENTS

DE    8219802 U1    4/1984
DE    19607782 A1    9/1997

(Continued)

*Primary Examiner* — Michael McCullough
*Assistant Examiner* — Brendan Tighe
(74) *Attorney, Agent, or Firm* — Loginov & Associates; William A. Loginov

(57) ABSTRACT

The invention refers to a feed and load unit serving for feeding or removing one or more work pieces in the machining chamber of a machine tool for machining purposes. For this the feed and load unit comprises at least two work piece carriers movably on a guide path. The work piece carrier serves for picking up at least one work piece. In the guide path a guide path section, angularly or diagonally to the direction of conveying of the work pieces on the guide path, movably by a drive is, provided. The guide path section is able to pick up at least one work piece carrier. The guide path section is shifted for loading and unloading purposes in the direction of the machining chamber.

10 Claims, 5 Drawing Sheets

(56) References Cited

U.S. PATENT DOCUMENTS 8,043,042 B2 * 10/2011 Yazawa .................. B25J 9/042
 294/103.1
2007/0289115 A1 12/2007 Kawai et al.

FOREIGN PATENT DOCUMENTS

| DE | 10 2007 023 917 A1 | 5/2007 |
| EP | 0 128 090 A1 | 5/1984 |
| EP | 0289453 A1 | 11/1998 |
| JP | 56009153 A | 1/1981 |

* cited by examiner

FEED AND LOAD UNIT

FIELD OF THE INVENTION

The invention refers to a feed and load unit provided for feeding and/or removing one or more work piece/s for machining purposes on the machining point in machining chamber of a machine tool, wherein the feed and load unit comprises at least two work piece carriers movably on a guide path, and the work piece carriers serve for picking up and conveying of the at least one work piece.

BACKGROUND OF THE INVENTION

Feed and load units of this type are intended for removing in a short time in the machine tool the finished work pieces from the machining chamber, and to load a new work piece in the machining chamber for machining.

In this connection the term "load unit" has to be understood as generic term for loading and unloading, respectively, that is feeding and removing of work pieces to and from the machine tool.

Usually, in the state of the art the work pieces are arranged on a work piece carrier that can move on a guide path. It is possible here, that a work piece carrier can carry only exactly one or also several work pieces (even different work pieces). It is tantamount here, whether the work piece/s is/are arranged directly on the work piece carrier, or the work piece/s is/are attached to a work piece pallet, and thus the work piece is supported indirectly on the work piece carrier.

Usually, on the guide path at least two movable work piece carriers are located, wherein, seen in conveying direction of the work pieces, the first work piece carrier serves for removing the finished work piece from the machine tool, and the second work piece carrier, arranged behind it, feeds the next work piece to be machined. Depending on the dimensioning of the guide path or the feed and load unit, it is, of course, also possible, that more than two, for example three, four or even more work piece carriers are on the guide path.

The guide path serves for conveying the work piece carriers, and is configured, for example, extending straight and/or curved.

In the state of the art the arrangement is configured such that the work piece carrier feeds in a suitable way the work piece to the machine tool, then, during the work piece change phase, hands the work piece in the machining chamber, or picks up the finished work piece and removes it from the machining chamber. The work piece carrier is here only during a rather short period of time in the machining chamber, namely only for picking up or putting on the work piece. The machining chamber is adapted and optimized perfectly to the size of the work piece to be machined. If the work piece carrier remains during machining in the machining chamber, precious space would be wasted. Therefore, usually the guide path is arranged next to the machine tool, and the work piece carriers each are arranged such that they hand the work piece from the guide path in the machining chamber, or shift it back. For this motion a separate drive is required that is arranged at each work piece carrier.

This leads to a rather large effort as the drive at the first work piece carrier serves only for unloading, i.e., taking the finished work piece out of the machining chamber, and the drive at the second work piece carrier is only used for loading the work piece, respectively.

Furthermore, an appropriate power supply has to be provided for the drive traveling together with the work piece carrier, what can basically be realized with appropriate drag chains and the like, but is appropriately expensive. Besides the corresponding cost, here also the required space for this power supply has to be taken into consideration. In addition to that, the drive itself requires space on the work piece carriers, that might be required for conveying the work piece.

BRIEF SUMMARY OF THE INVENTION

It is the problem of the present invention to improve the previously described state of the art, and to overcome at least one of the before mentioned disadvantages.

In order to solve this problem the invention refers to the feed and load unit as described in the beginning, and suggests, that the guide path has a guide path section, angular or diagonally to the direction of conveying of the work pieces on the guide path, movably by a drive and picking up at least one work piece carrier, and the guide path section sets the work piece carrier for loading and unloading purposes in the direction of the machining chamber or back.

Usually, the work piece is shifted diagonally, that means rectangular to the guide path from it in order to move the work piece from the guide path in the machining chamber, on the machining point in the machine tool, or to pick it up there. However, the invention is not limited only to the rectangular design, but it comprises also an acute movement of the guide path section picking up at least one work piece carrier, relatively to the longitudinal extension or direction of conveying of the work pieces. During the changing process this guide path section is moved out of the guide path, what can be done without any problems, as during this period of time no work piece carrier has to be moved on the guide path across the area of the guide path section. The guide path section is equipped with a guide or rail, otherwise identical with the usual guide path, or similar guide elements, in order to allow a conveying, as usual, of the work piece carrier on the guide path without any problems.

The essential advantage of the invention is the fact that the drive, that has been necessary for moving the work piece in or out of the machining chamber, traveling together with the work piece carrier, is saved, and now a drive is provided for the guide path section that can be used in the same way for the loading process as well as also for the unloading process. Only the respective work piece carrier is changed according to the machining process.

Therefore, the suggestion according to the invention works with a clearly smaller number of drives. Furthermore, the energy supply for the drives traveling together with the work piece carrier, as in the state of the art, is not required any longer. The drive for the guide path section can be arranged basically below the guide path, thus does not interfere with the access to the machining chamber.

Another advanced suggestion provides, that a press-on device is provided for the exactly positioned put-on of the work piece on the machining point. For the highly accurate machining of the work piece in the machine tool, so-called index seats or index pins are provided at the machining point in the machine tool, on which the work piece is put either directly or indirectly, for example exactly positioned by a suitable work piece pallet, and thus a highly accurate machining is possible, as thus the relative position of the work piece in the machining aggregates (tool spindles, machining tool and so on) is exactly determined. It is therefore decisive for a highly accurate machining to make sure that the work piece is actually supported exactly positioned on the machining point. The use of the suggested press-on device allows a safe positioning of the work piece at the machining point on the index pins and other supporting points. By using the press-on device the risk of an incorrect positioning of the work piece in the machine tool is reduced considerably, and thus, to the same extent, also the risk of a reject production.

There are several options for designing the alternatively provided press-on device, the following list being not complete for this.

First of all, it is provided that the press-on device is configured at the movable guide path section and traveling together with it. This modification has the advantage that the press-on device is provided for several different work piece carriers, and thus, for example, a machine tool is associated in particular with a press-on device outside the machine tool at the guide path section. An appropriately efficient use of the thus realized press-on device is the result.

In another suggestion the press-on device is configured at the work piece carrier and traveling with it. A configuration of this kind allows that the press-on device is secured also during the conveying of the work piece carrier on the guide path, that is before and after the respective machining by the use of the press-on device.

When the press-on device is employed in the machine tool itself, the press-on device is present stationary at the place where it is employed mainly. Then the weight of the press-on device does not have to be taken into consideration during the conveying of the work piece carriers and so on.

In an alternative embodiment it is provided that the work piece carrier is designed fork-like. The work piece is supported on the two or more prongs of the fork-like design, and makes it possible that the work piece is put on or lifted of the receiving device or the machining point by a vertical movement.

In order to put or remove the work piece on or from the machining point, there are also several modifications, the following list not being complete.

First of all, it is suggested, that the work piece carrier on the guide path section can be lifted or lowered for loading or unloading purposes. In this modification the work piece carrier executes a movement vertically to the, as a rule horizontally movable, guide path section, wherein here a rather small stroke of several millimeters to a few centimeters is already enough for reaching the desired effect, namely putting the work piece on the projecting index points or lifting it from them. For that the work piece carrier has, for example, an appropriate vertical drive, configured for example as an electric motor or hydraulically or pneumatically, and is supported and guided by corresponding vertical guides. The advantage of this modification is the fact, that the drive has actually to be dimensioned only for the weight of the work piece and the elements of the work piece carrier supporting the work piece, i.e. rather small drives are sufficient.

Alternatively to this it is suggested, that the guide path section is arranged at a lifting or lowering console, and the console can be lifted and lowered for unloading or loading purposes. This modification may be more laborious in constructional respect, as, besides the weight of the work piece and the work piece carrier, also the weight of the traveling guide path section has to lifted and lowered, respectively, however, this modification does without a respective vertical drive in each single work piece carrier and thus saves also space, as this vertical drive can be realized spaced from the machining chamber.

Another modification for putting on or lifting the work piece from the work piece carrier provides that the machining point is arranged at a work piece support that can be lifted and lowered, respectively, and this work piece support can be lifted or lowered for loading or unloading purposes. This modification has the advantage, that this vertical axis, realized in the machine tool, in particular in the work piece support or the work piece table, cannot only be employed for the work piece machining but it even helps carrying out the work piece change. This saves the separate arrangement of a drive in vertical direction at the work piece carrier or at the guide path section.

The suggested feed and load unit does not only have the function of loading work pieces from and in the machine tool, but of course it serves also for feeding and removing (and guiding, respectively) the work piece. For the conveying of the work piece carriers on the guide path a drive is provided. The configuration of the drive is here realized very variably. For example, it is possible that the drive path is realized as roller conveyor, and at least a part of the rollers can be driven (for example by electric motors) to convey the work piece carrier. Alternatively furthermore a drive, for example an electric motor, is provided at the work piece carrier itself that can be moved via driven means, for example drive wheels or the like, on the guide path. Of course, alternatively also a linear motor concept or the like can be realized in the feed and load unit.

It is a clever design of the drive to provide for the drive of the work piece carrier on the guide path a conveyor beam that can be moved and driven parallel to the guide path and that has at least two connecting points for the at least non-positive connection with one work piece carrier each with the conveyor beam. This drive concept makes it possible to convey by one conveyor beam to be moved two or more work piece carriers at the same time. This uses the fact that feeding a new work piece can be performed at the same time as removing the finished work piece. In order to allow the diagonal movement of the work piece carrier on the guide path section, a connection, that can be released easily, is provided at the conveyor beams, for which, for example, an at least non-positive connection is provided. This can be performed, for example, by magnetic forces or a simple mechanic lock, brake or the like. Instead of an only non-positive connection, however, also a positive connection is possible, that becomes active, for example, when the work piece is moved on the guide path by the conveyor beam. That can be realized, for example, by a suitable undercut or the like.

An advantageous configuration of the suggested feed and load unit provides that exactly two work piece carriers are provided on the guide path, and a first work piece carrier travels between a work piece pick up spot and the guide path section, and a second work piece carrier travels between the guide path section and the work piece removal spot back and forth. This configuration achieves a very compact construction of the feed and load unit, wherein with the suggested conveyor beam a simultaneous drive of the first and second work piece carrier is possible. The work piece is conveyed by the first work piece carrier into the machine tool, or the machine tool is loaded with it, after machining the machining chamber of the machine tool is unloaded by the second work piece carrier and the work piece is removed. The work piece is here put at a work piece pick-up spot on the first work piece carrier, and at the work piece removal spot, after having been machined accordingly, lifted from the second work piece carrier. The work piece is transferred after that from the first work piece carrier via the machining point in the machine tool to the second work piece carrier.

Basically, it is provided, that the suggested feed and load unit comprises at least two work piece carriers, wherein in the suggested design with exactly two work piece carriers a perfect space-saving concept is suggested. It is provided here that the work piece is conveyed, for example, manually or by a portal or a robot to the work piece pick-up spot, and removed in a suitable way, that is, for example, also manually, by a portal or a robot at the work piece removal spot. Thus, a feed and load unit configured in this way is part of a more complex conveying system connecting several machine tools with one another.

In another alternative concept it is provided that the suggested feed and load unit serves for interlinking of at least two machine tools arranged one behind the other in the direction of work piece conveying. Usually, then on the suggested feed and load unit a multitude of work piece carriers will be present that, if necessary, also for example in a closed conveying circuit, approach all or several machine tools arranged one behind the other.

The suggested guide path section allows that the feed and load unit requires exactly one drive, namely the drive of the guide path section, for feeding the work piece from the guide path in the machining chamber. The arrangement is here chosen such that the guide path section serves for the mutual picking-up and movement of the first and second work piece carrier, respectively, in the direction of the machining chamber and back. The result is a high capacity utilization and therefore also a high efficiency of the suggestion.

The advantages according to the invention are not only used by the suggested feed and load unit, also a machine tool, comprised by the invention, that is equipped with a suggested feed and load unit uses in a considerable way the advantages of the invention, wherein in particular the vertical traveling of the support point of the machine tool supports loading and unloading considerably.

DETAILED DESCRIPTION

In the figures identical or corresponding elements each are indicated by the same reference numbers and therefore are, if not useful, not described anew.

Figure 1A:
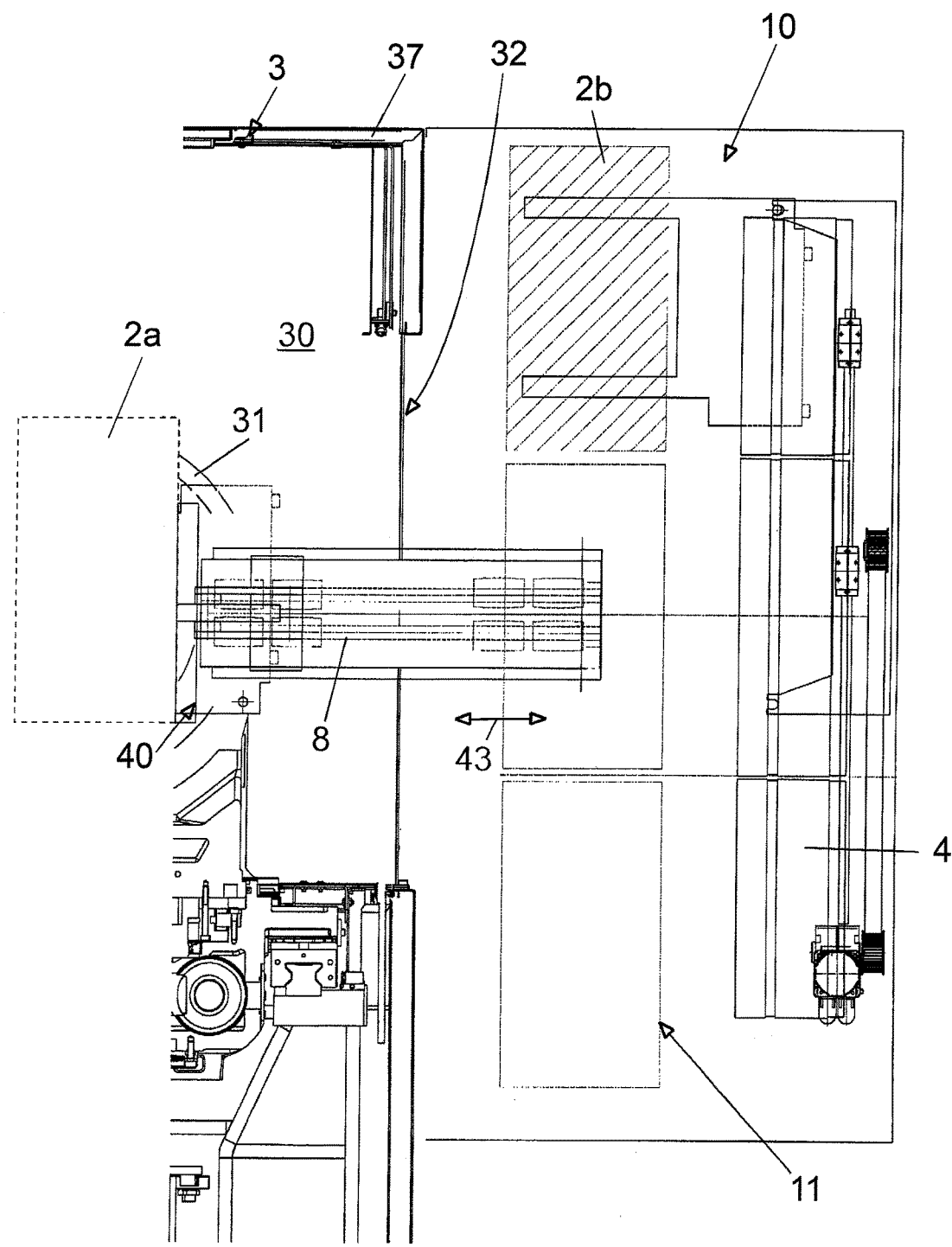
FIGS. 1a, 2a, and 3 show the feed and load unit according to the invention, in a top view each time in different positions.

The enclosed figures show in top and side view different positions of the feed and load unit 1 according to the invention. FIG. 1a corresponds here with FIG. 1b, as well as FIG. 2a with FIG. 2b.

Figure 2A:
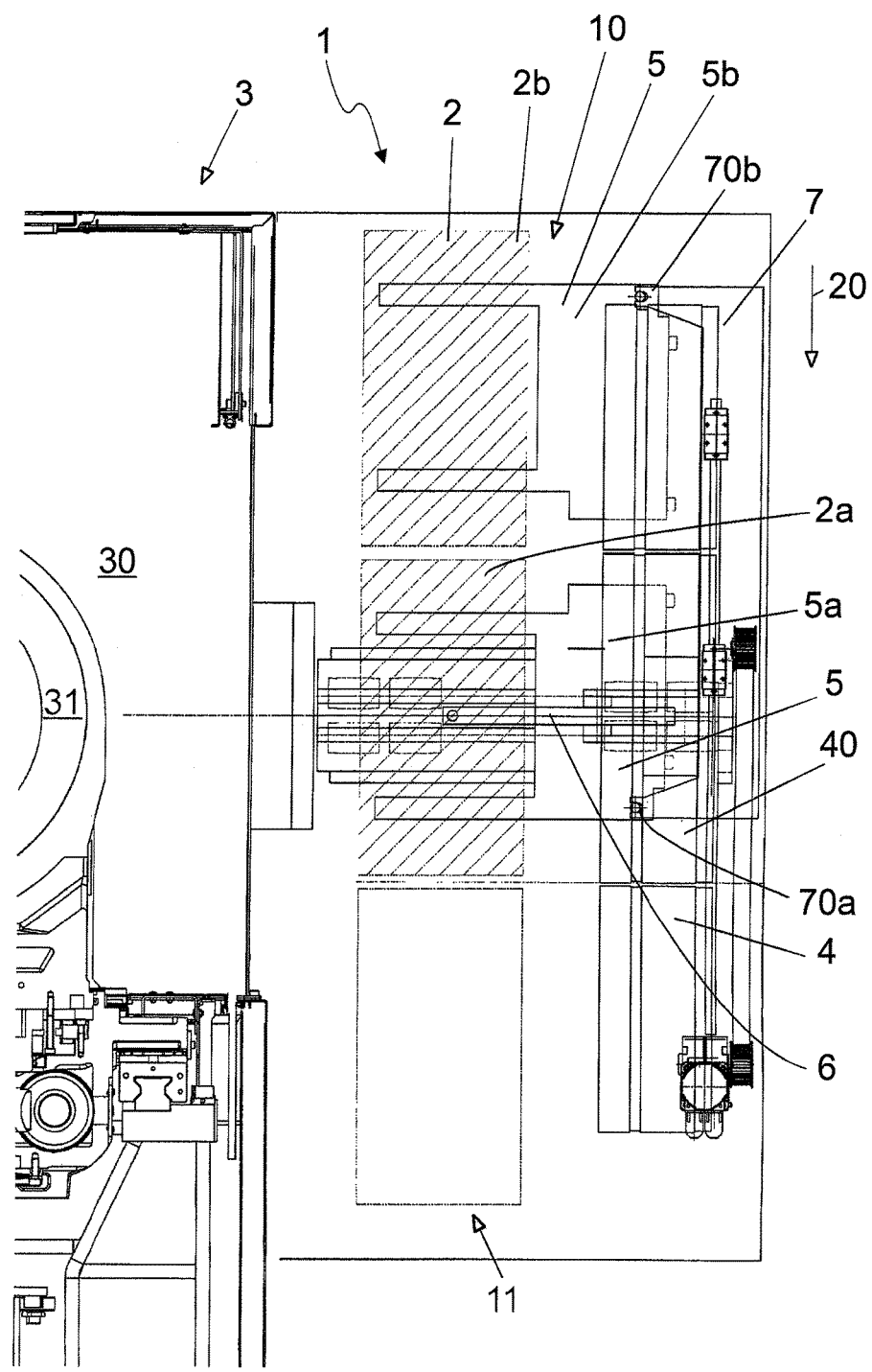

A configuration of the feed and load unit 1 according to the invention is shown in more detail and described, for example, in FIG. 2a. The feed and load unit 1 serves here for feeding a multitude of work pieces 2, 2a, 2b to the machining chamber 30 of a machine tool 3, indicated on the left hand side in FIG. 2a, or to remove them from it after their machining.

For that the feed and load unit 1 has a guide path 4 on which two work piece carriers 5, 5a and 5b can be driven movably along the guide path 4.

The work piece carriers 5a, 5b serve for carrying one work piece 2, 2a, 2b each.

The term "work piece 2" is here defined very variably, the work piece 2 can be supported directly on the work piece carrier 5, or can rest on a work piece pallet (not shown) on the work piece carrier 5. It is clear that the modification shown here can be employed, of course, in the same way when one work piece carrier 5 carries several work pieces 2 (not shown).

The work pieces 2, 2a, 2b are conveyed on the guide path 4 along the direction of conveying 20, here from the top to the bottom. The work piece 2a, second in the direction of conveying 20, is in the middle area of the guide path 4, the work piece 2b, first in the direction of conveying 20, has just been put on the fork-like designed work piece carrier 5b in the work piece pick-up spot 10.

Conveying the work pieces 2a, 2b is performed with work piece carriers 5, 5a, 5b, arranged and movable on the guide path 4, the work piece carrier first in the direction of conveying being referred to by reference number 5a, the second work piece carrier by reference number 5b.

The first function of the feed and load unit 1 is to feed the work piece 2b, put on the second work piece carrier 5b on the work piece pick-up spot 10, as fast as possible to the machining in the machine tool 3. For achieving this, first of all, the work piece 2a, just finished in the machine tool 3, has to be removed from it; for that the first work piece carrier 5a is used.

FIG. 2a shows the situation where the machining of the first work piece 2a has just been finished and the work piece has been conveyed out of the machining chamber 30 by means of the guide path section 40.

FIG. 1a, however, shows the situation where the guide path section 40, arranged between the work piece pick-up spot 10 and the work piece removal spot 11, has been shifted completely to the left in the machining chamber 30 of the machine tool. The situation shown in FIG. 1a is the time when the work piece 2a has been finished in the machine tool 3. The machine covering 37 limiting the machining chamber 30 is here opened such that an opening 32 occurs between the guide path 4 and the machining chamber 30 through which the guide path section 40 can intervene in the machine tool 3.

Figure 2B:
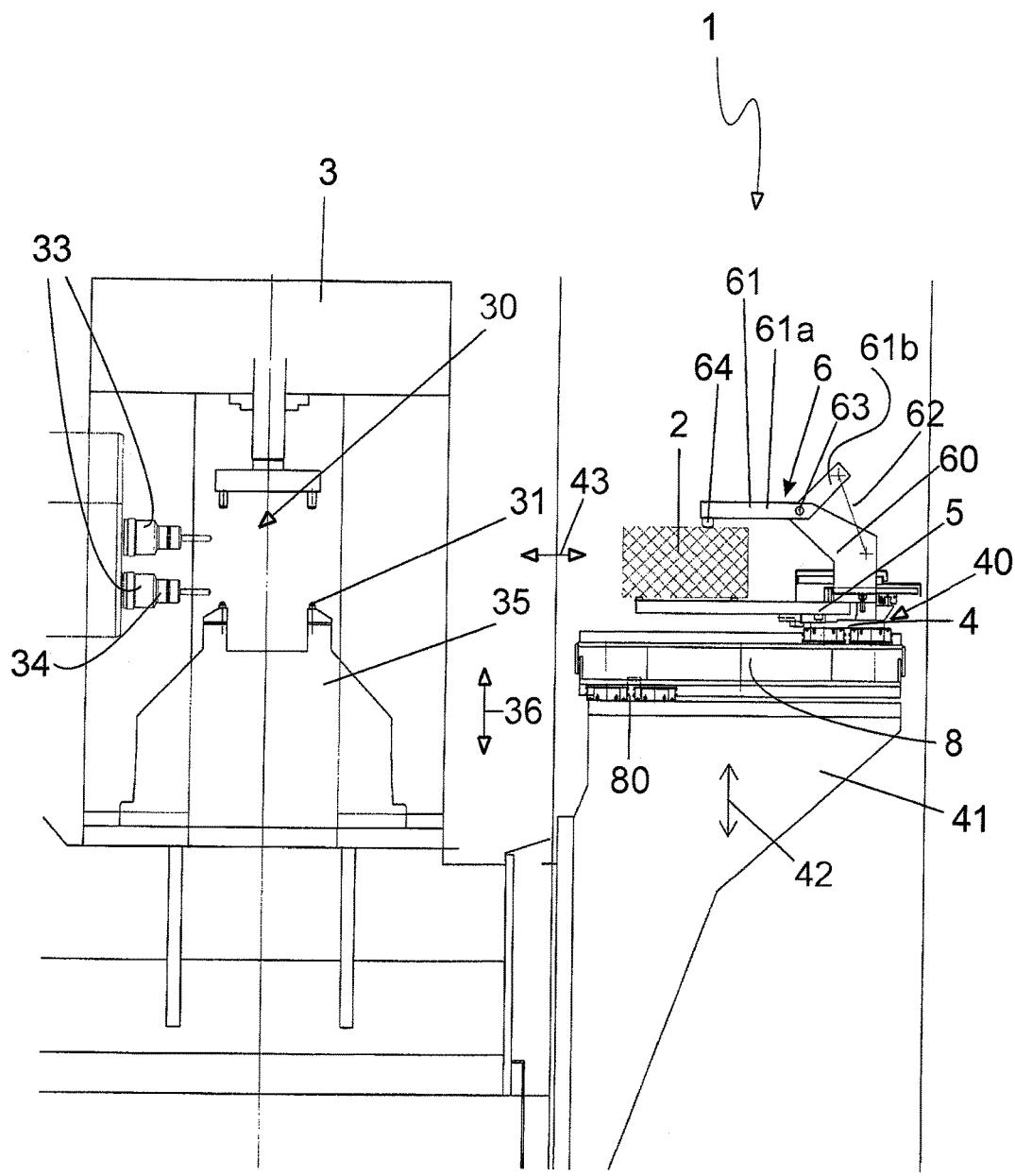
Figure 3:
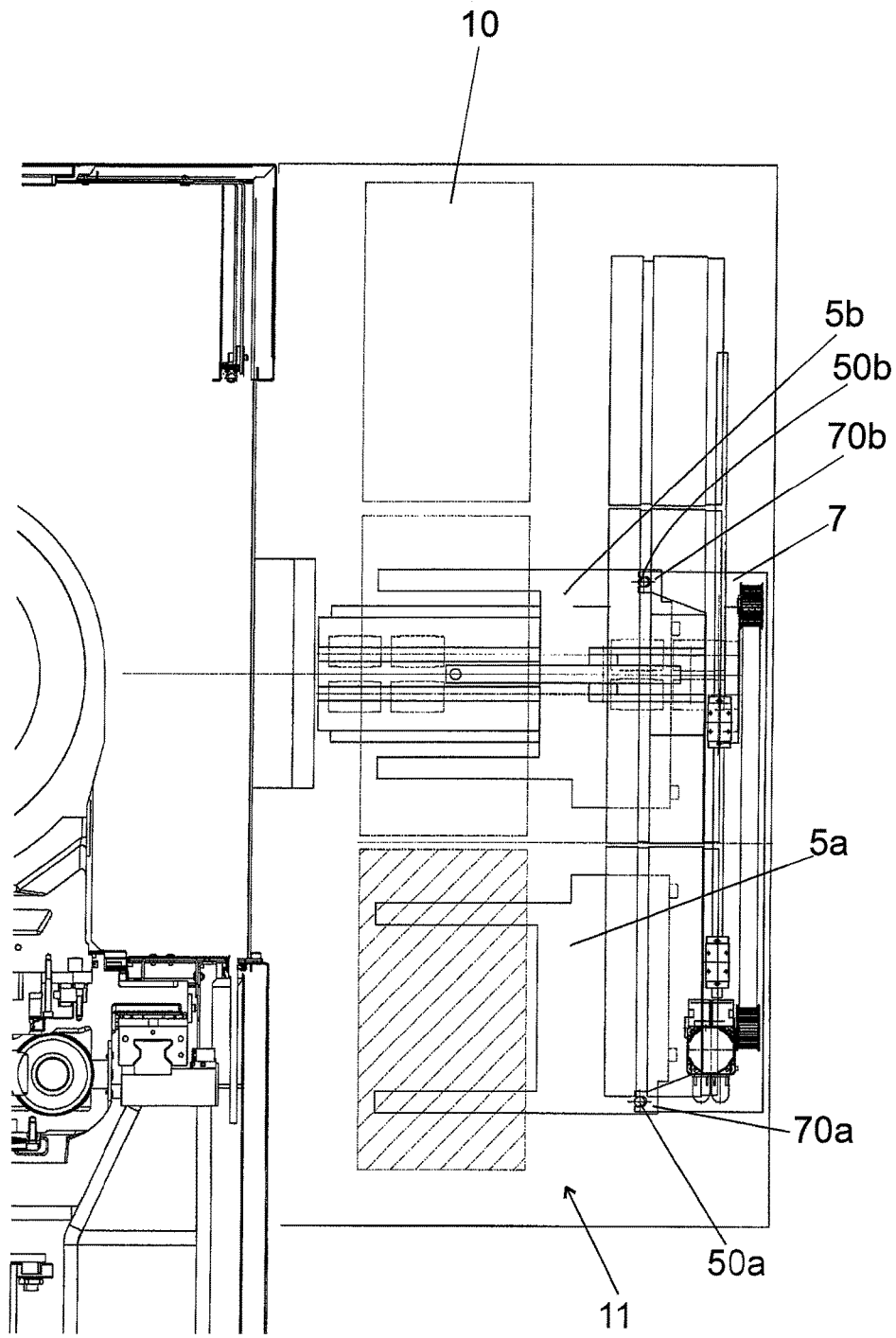

In FIG. 2b it can be seen clearly in a side view how the work piece 2 rests on the work piece carrier 5. The guide path 4 has here a guide path section 40 that can move out of the guide path 4, through which the work piece carrier 5 together with its work piece 2 can be conveyed in the machining chamber 30. This is indicated by the double arrow 43.

The machine tool 3 has a multitude of machining spindles 33 that each drive one machining tool 34 rotatably.

Figure 1B:
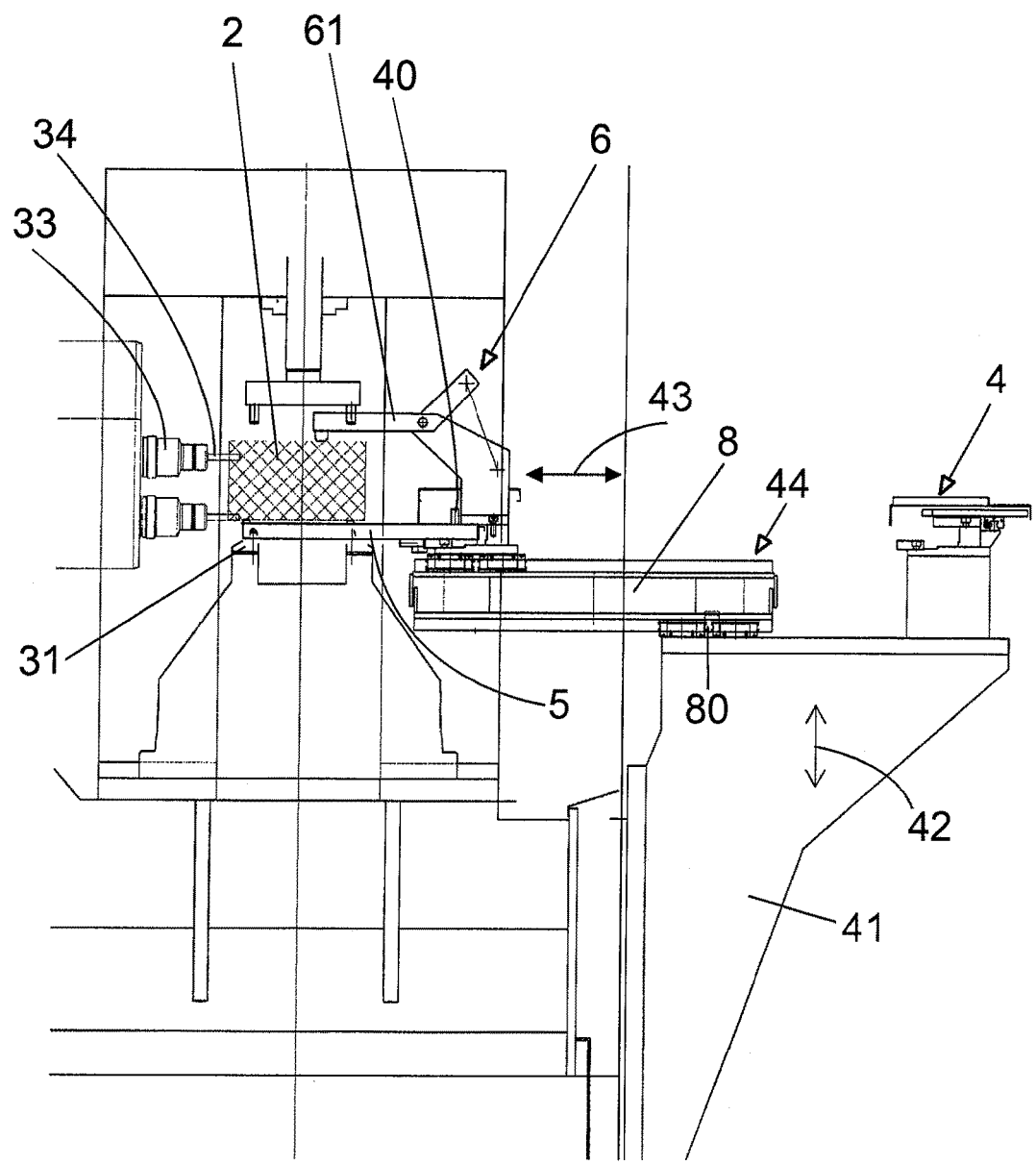
FIGS. 1b and 2b show in a side view the feed and load unit according to the invention, in two different positions.

Therefore the guide path section 40 is constructed somewhat more complex. It has a diagonal guide 8 on which the guide path section 40 can move rectangular to the usual direction of conveying 20 of the work piece (along the double arrow 43). The diagonal guide 8 is here not configured as stationary component, but is itself also movable, as it can be seen clearly when FIGS. 2b and 1b are compared. The diagonal guide 8 is supported on the console 41; for this suitable slide bearings 80 are provided. In the area of the slide bearings 80 also a drive 44 is provided, on the one hand, for the diagonal guide 8 relatively to the slide bearing 80, but also a drive for the guide path section 40 is provided on the diagonal guide 8. This can be realized in a simple manner with a double-used drive. The movement can be deduced in a simple way from the drive to the two moved elements diagonal guide 8 relatively to the console 41 and guide path section 40 relatively to the (movable) diagonal guide 8 by means of a not shown transmission.

The console 41 can move vertically, this be indicated by the double arrow 42. This vertical movement relatively to the, for example, stationary machining point 31, makes it possible in a simple manner to put the work piece 2 from the work piece carrier 5 on the machining point 31 or to pick it up from it.

The same can be achieved by the fact that the work piece support 35 (see FIG. 2b) can move vertically, as it is indicated by double arrow 36. Thus it is also possible, during an upward movement of the work piece support 35, to lift the work piece 2 from the work piece carrier 5; by a lowering movement of the work piece support 35 the work piece 2 is lifted from the machining point 31 and put on the work piece carrier 5.

An advantageous development of the feed and load unit 1 provides that a press-on device 6 is employed. In the embodiment shown in FIG. 2b the press-on device 6 is realized traveling together with the guide path section 40. The press-on device 6 is formed by a gallows 60 carrying a pivot point 63 at its top area located above the upper edge of the work piece 2. In the pivot point 63 a lever-like punch 61 is supported pivotably. The punch 61 consists in the example shown here of two punch sections 61a and 61b. The first, longer punch section exceeds the work piece 2. The second punch section 61b extends on the other side of the pivot point 63. At its end opposite the pivot point 63 a drive 62, for example a hydraulically or pneumatically driven working cylinder, an electric motor or the like, is engaged. The lever-like punch 61 is pivoted anti-clockwise thus by the lever effect through activating the drive, and the punch point 64 is pressed on the work piece 2. By means of this, first of all the work piece 2 is fixed on the work piece carrier 5, dropping down or slipping of the work piece 2 relatively to the work piece carrier 5 is thus prevented. Thus it is basically possible to realize rather large accelerations, i.e. fast movements of the work piece carrier 5, what is an advantage in particular for a fast work piece change in the machine tool. In particular it is provided, that the press-on device 6 travels together with the guide path section 40 (see FIG. 1b), and thus the press-on device 6 does not only allow a rather fast movement of the guide path section or the work piece in the case of a work piece change, but it serves also for a secure, exactly position put-on of the work piece 2 on the machining point 31. In particular in FIG. 1b it can be seen clearly, that the supporting points at the machining point 31 are configured, on the one hand, conically, and, on the other hand, pin-like, and thus are supposed to guarantee a secure, exactly positioned fixing and clamping of the work piece in the machine tool. In the situation shown in FIG. 1b the work piece 2 is in the machining chamber 30, and the punch 61 pushes on the work piece 2. If the console 41 is slightly lowered (double arrow 42), the fork-like configured work piece carrier 5 below the work piece 2 is released, because the work piece 2 is then supported on the index points or supporting points of the machining point 31. The punch 61 is here configured sufficiently springy, so it does not lead to jamming when the console 41 executes lowering movements. At the same time, however, an appropriate power component acts on the work piece 2 downwards, to reach a safe, exactly positioned seat of the work piece 2 on the machining point 31.

For conveying the work piece carriers 5a, 5b on the guide path 4 (under the influence of the guide path section 40) a conveyor beam 7 is provided. In the example shown here the guide path 4 is configured straight, however, if necessary it can also be curved. The conveyor beam 7 has at its respective ends connecting points 70a, 70b serving for connecting, i.e. coupling to the respective work piece carrier 5a, 5b.

For this the connecting points 70 are realized as U-shaped recesses that allow a catching function in longitudinal direction of the guide path 4 positive interlocking, however, allow an uncoupling of the tappet 50a, 50b during the diagonal movement of the conveyor beam 43 provided at the work piece carrier 5a, 5b. This movement of the guide path section 40 out of the guide path 4 to the machining chamber 30 thus guides also at the same time the tappet 50a and 50b, respectively, out of the connecting point 70a, 70b, or, during the returning motion, inserts it again, and thus automatically an uncoupling or coupling of the respective work piece carrier 5a, 5b with the conveyor beam 7 is achieved.

The sequence of feeding, or the loading and unloading process of the suggested feed and load unit 1 is as follows.

A work piece 2 to be machined is put on the work piece pick-up spot 10 on a work piece carrier 5, 5b.

The conveyor beam 7 moves from its upper position in the lower position in such a way that the first work piece carrier 5b gets from the work piece pick-up spot to the guide path section 40.

The guide path section 40 is shifted diagonally (double arrow 43), the work piece carrier 5b resting on it gets in the direction of the machining chamber 30, thus the work piece 2 resting on the work piece carrier 5b gets in the machining chamber 30.

What follows then is either a put-on movement of the console 41 carrying the guide path section 40, or a lifting movement of the work piece support 35 carrying the machining spot 31. Thus the work piece 2 is released from the work piece carrier 5b.

The work piece carrier 5b is unloaded, it is retreated out of the machining chamber 30 by retreating the guide path section 40 such that the guide path section 40 couples again with the guide path 4.

The conveyor beam 7 is again moved back such that the first work piece carrier 5b gets again on the work piece pick-up spot 10, wherein at the same time the empty second work piece carrier 5a is shifted from the work piece removal spot 11 to the guide path section 40.

After the machining of the work piece 2 in the machining chamber 3 has been finished, again the guide path section 40 moves along the double arrow 43 in the machine tool 3, wherein the machining chamber 30 can be accessed through the opened opening 32. The work piece carrier 5a grips in a suitable way under the finished work piece 2, and what follows is a relative movement between the work piece carrier 5a and the machining point 31 such that the work piece 2 is released from the machining point 31 and rests on the work piece carrier 5a.

After that the work piece carrier 5a is retreated by retreating the guide path section 40, the loaded work piece carrier 5a gets back on the guide path 4, the guide path section 40 couples again with the guide path 4, at the same time also the work piece carrier 5a is coupled in the connection point 70a of the conveyor beam 7 in order to move during the next following downward movement of the conveyor beam 7 the finished work piece 2 to the work piece removal spot 11.

After that the feed and load process is performed anew.

The claims filed with the application now and later on are attempts for formulating without prejudice for the obtaining of a wider protection.

If here, on further examination, in particular also of the relevant state of the art, it turns out that one or the other characteristic may be convenient for the target of the invention, however, not decisive, of course, already now a formulation is striven for, that does not contain anymore such a characteristic, in particular in the main claim.

Furthermore, it has to be taken into consideration, that the configurations and modifications described in the different embodiments and shown in the figures can be combined with each other in any way. Single or several characteristics can be exchanged for each other in any way. These combinations of characteristics are also disclosed.

References mentioned in the sub-claims indicate the further development of the subject matter of the main claim through the characteristic of the respective sub-claim. However, these are not to be seen as a waiver of obtaining an independent objective protection for the characteristics of the referred sub-claims.

Characteristics so far only disclosed in the description, can be claimed in the course of the proceedings as being of inventive relevance, for example for delimitating from the state of the art.

Characteristics only disclosed in the description or even single characteristics of claims containing a multitude of characteristics can be taken over in the first claim at any time for delimitating from the state of the art, and this is even if such characteristics have been mentioned in connection with other characteristics, or achieve particularly convenient results in connection with other characteristics.

What is claimed is:

1. A feed and load unit, provided for at least one of (a) feeding and (b) removing one or more work pieces for machining purposes on a machining point in a machining chamber of a machine tool, the feed and load unit comprising:
    a guide path oriented in a first guide path direction in a first plane and having a guide path section, the guide path section being movable out of the guide path during a changing process in a direction perpendicular to the first guide path direction and in the first plane, wherein the guide path section forms a continuous part of the guide path outside of the changing process;
    at least two work piece carriers configured to pick up and transport the at least one workpiece and being movable along the guide path in the first guide path direction and in the first plane, wherein the guide path section, the at least two work piece carriers, and the work piece being movable, by a drive, in the first plane and in a direction perpendicular to the first guide path direction such that the work piece carrier is moved in the first plane and in the direction perpendicular to the first guide path direction and to or from the machining chamber; and
    a press-on device that is arranged at the movable guide path section and moving together with the movable guide path section.

2. The feed and load unit according to claim 1, wherein the press-on device is provided for a positionally accurate placing of the workpiece.

3. The feed and load unit according to claim 1, wherein the press-on device is arranged on the work piece carrier and is adapted to move with the workpiece carrier.

4. The feed and load unit according to claim 1, wherein the work piece carrier is at least one of (a) constructed and arranged in a fork shape, and (b) constructed and arranged to be lifted and lowered, respectively, on the guide path section for loading or unloading purposes.

5. The feed and load unit according to claim 1, wherein the work piece carrier is constructed and arranged to be lifted and lowered, respectively, on the guide path section for loading or unloading purposes and the guide path section is arranged at a console that is constructed and arranged to be lifted and lowered, respectively, for unloading and loading purposes, respectively, the machining point is arranged at a work piece support that is constructed and arranged to be lifted and lowered, respectively, and the work piece support is constructed and arranged to be lowered or lifted for unloading or loading purposes.

6. The feed and load unit according to claim 1, further comprising a drive of the work piece carrier on the guide path including a conveyor beam, movably parallel to the guide path, that is constructed and arranged to be driven, the beam having at least two connecting points for the at least non-positive connection with at least one of (a) one work piece carrier each with the conveyor beam, and (b) exactly two work piece carriers on the guide path, wherein a first work piece carrier travels back and forth between a first work piece pick-up point and the guide path section, and a second work piece carrier travels back and forth between the guide path section and a work piece removal point.

7. The feed and load unit according to one claim 1, wherein the feed and load unit is constructed and arranged to interlace at least two machine tools arranged one after the other in the direction of work piece conveying.

8. The feed and load unit according to claim 1, wherein the guide path section is constructed and arranged for the mutual picking-up and motion of the work piece carrier and another work piece carrier, respectively, in the direction of the machining chamber and back.

9. The feed and load unit according to claim 1, wherein exactly one drive for the guide path section is provided.

10. A machine tool for the feed and load unit according to claim 1.

* * * * *